United States Patent
Aoki et al.

(12) 
(10) Patent No.: US 6,498,230 B2
(45) Date of Patent: Dec. 24, 2002

(54) POLYMER AND MACROMOLECULAR SOLID ELECTROLYTE CONTAINING THE SAME

(75) Inventors: Minoru Aoki; Ryuji Aizawa; Shoji Ito; Jinxing Pan, all of Ibaraki (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/747,446

(22) Filed: Dec. 22, 2000

(65) Prior Publication Data

US 2001/0020084 A1 Sep. 6, 2001

(30) Foreign Application Priority Data

Dec. 28, 1999 (JP) ............................. 11-374637
Oct. 18, 2000 (JP) ........................... 2000-318116
Nov. 16, 2000 (JP) ........................... 2000-349822

(51) Int. Cl.[7] .................... C08G 73/00; C08G 73/06
(52) U.S. Cl. ................... 528/422; 528/423; 528/425; 528/361; 528/363; 528/391; 528/392; 525/403; 525/404; 525/408
(58) Field of Search ............... 528/522, 425, 528/361, 391, 392, 363, 422, 423; 525/403, 404, 408

(56) References Cited

U.S. PATENT DOCUMENTS

| | | | | |
|---|---|---|---|---|
| 3,898,188 A | | 8/1975 | Rembaum et al. | 260/2 R |
| 4,463,071 A | | 7/1984 | Gifford et al. | 429/194 |
| 4,463,072 A | | 7/1984 | Gifford et al. | 429/194 |
| 4,761,273 A | * | 8/1988 | Grollier et al. | 424/47 |
| 4,842,849 A | * | 6/1989 | Grollier et al. | 424/70 |
| 6,025,457 A | | 2/2000 | Ohno et al. | 528/170 |

FOREIGN PATENT DOCUMENTS

| | | | |
|---|---|---|---|
| EP | 0 639 592 A1 | 2/1995 | ......... C08F/283/06 |
| EP | 0 754 712 A1 | 1/1997 | ......... C08F/283/06 |
| EP | 0 850 963 A1 | 7/1998 | ......... C08F/283/06 |
| JP | 60-136180 | 7/1985 | .......... H01M/10/40 |
| JP | 10-83821 | 3/1998 | ............ H01M/8/02 |
| WO | WO 99/33918 | 7/1999 | ........... C08L/67/02 |

\* cited by examiner

Primary Examiner—Duc Truong
(74) Attorney, Agent, or Firm—Fish & Richardson P.C.

(57) ABSTRACT

This invention is to provide a macromolecular solid electrolyte exhibiting high ion conductivity even at low temperatures and a polymer used therefor. This invention relates to a polymer formed of structural units represented by the following formula (1):

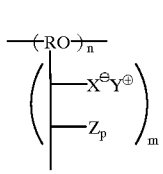

(1)

wherein R represents a linear or branched alkylene residue of 1 to 4 carbon atoms; $X^-$ represents a deprotonated residue of an acid; $Y^+$ represents a cation of a nitrogen-containing compound; Z represents a residue of a monoethylenically unsaturated compound; m represents a number of average addition mols of a branched chain bound to the structural unit, —(RO)—, forming a main chain and is in the range of 2 to 20; n is in the range of 3 to 500; and p is in the range of 0 to 2, and macromolecular solid electrolyte comprising the polymer as an essential component.

16 Claims, No Drawings

POLYMER AND MACROMOLECULAR SOLID ELECTROLYTE CONTAINING THE SAME

BACKGROUND OF THE INVENTION

1. Field of the Invention

This invention relates to a macromolecular solid electrolyte forming a molten salt at room temperature and a polymer to be used therein. More particularly, this invention relates to a macromolecular solid electrolyte exhibiting excellent ion conductivity at low temperatures as of not more than 10° C. and a polymer to be used therein.

2. Description of the Related Art

As an electrolytic material for a fuel cell, for example, a mixture of inorganic compounds which has been thermally molten at an elevated temperature has been heretofore known. Generally, the molten salt which is obtained in a system formed by mixing inorganic compounds, though famed for the lowness of melting point, has a melting point approximating 300° C. For the purpose of enabling the fuel cell to serve as a practical product, the task of remarkably lowering the melting point thereof has been persisting.

Attempts to realize fully satisfactory ion conductivity even at room temperature have been being made and the development of a salt melting at room temperature and to be obtained by the addition of an inorganic salt to a salt of an organic compound has been energetically promoted. U.S. Pat. No. 4,463,072, U.S. Pat. No. 4,463,071, and JP-A-60-136,180 disclose electrolytes using a mixture of an aluminum halide with 1,3-dialkyl imidazol halide or 1,2,3-trialkyl imidazol halide. Though the electrolytes using the compounds as mentioned above melts at room temperature and exhibits high ion conductivity, the aluminum halide encounters a drawback of yielding to decomposition on admitting water even in a very minute amount and the molten salt entails a problem of having the phase condition thereof become unstable on the exposure to change in temperature.

For the purpose of overcoming the problems mentioned above, a macromolecular solid electrolyte containing as an essential component thereof a molten salt polymer which is obtained by reacting an imidazolium derivative selected among 1,3-dialkylimidazolium halide and 1,2,3-trialkylimidazolium halide with a monomer to prepare a molten salt monomer and polymerizing the molten salt monomer has been disclosed in JP-A-10-83,821; and a macromolecular solid electrolyte having impregnated with an imidazolium salt derivative a polyanionic resin to be obtained by introducing a negative charge into a macromolecular acid, a porous macromolecular solid, or a macromolecular thin film has been reported in U.S. Pat. No. 6,025,457.

The macromolecular solid electrolytes disclosed in these official gazettes indeed have high ion conductivity at room temperature (in the neighborhood of 30° C.). They nevertheless are at disadvantage in suffering the ion conductivity to decline conspicuously at lower temperatures such as, for example, of not more than 10° C. and thus rendering fuel cells or lithium secondary cells using the electrolyte difficult to operate effectively at low temperatures. Regarding this point, conventional macromolecular solid electrolytes, while having ion conductivity (log σ, S/cm) of −3 to −4 at 30° C., still entail the same problem of suffering the ion conductivity thereof to decline to −6 at 0° C.

SUMMARY OF THE INVENTION

This invention has been attained in view of the state of affairs mentioned above and, therefore, has an object to provide a macromolecular solid electrolyte which can manifest high ion conductivity even at low temperatures.

Another object of this invention is to provide a polymer which is suitable for the use in such a macromolecular solid electrolyte as mentioned above.

The present inventors have already acquired a knowledge that in the production of a water-soluble graft polymer by the graft polymerization of a monomer component (B) comprising 40 to 100 mol % of (meth)acrylic acid (b1) and 0 to 60 mol % of another monoethylenically unsaturated monomer (b2) to a polyether compound (A) containing not less than 80 mol % of ethylene oxide as a component unit thereof and having a number average molecular weight of not less than 200 at a ratio such that the amount of the monomer component (B) is not less than 25 mass % based on the mass of the polyether compound (A), the reaction by the graft polymerization of the monomer component (B) to the polyether compound (A) in the presence of a polymerization initiator substantially in the absence of a solvent at a temperature of not less than 100° C. results in grafting a monoethylenically unsaturated monomer having (meth)acrylic acid as a main component thereof at a high content to the polyether moiety and thus permits the production of a water-soluble graft polymer having a high graft ratio and that the water-soluble graft polymer thus produced is usable as a dispersing agent for inorganic or organic substances sparingly soluble in water, a water treating agent for preventing the deposition of scale, and a fiber-treating agent such as a dyeing auxiliary and an antistatic agent for fibers and the polymer, when further cross-linked with a cross-linking agent, is usable as an absorbent resin (EP-A-639, 592).

The present inventors have further continued a diligent study on various polymers including the water-soluble graft polymers as mentioned above with a view to accomplishing the objects. They have consequently found that when a polymer to be obtained by the reaction of the polymer mentioned above with a specific halogenated nitrogen-containing compound is used in the production of a macromolecular solid electrolyte, the produced macromolecular solid electrolyte shows virtually no decline of ion conductivity even at low temperatures as of not more than 10° C. This invention has been perfected based on this knowledge.

Specifically, the objects mentioned above can be accomplished by a polymer formed of structural units represented by the following formula (1):

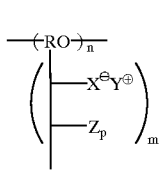

wherein R represents a linear or branched alkylene residue of 1 to 4 carbon atoms; X⁻ represents a deprotonated residue of an acid; Y⁺ represents a cation of a nitrogen-containing compound; Z represents a residue of a monoethylenically unsaturated compound; m represents a number of average addition mols of a branched chain bound to the structural unit, —(RO)—, forming a main chain and is in the range of 2 to 20; n is in the range of 3 to 500; and p is in the range of 0 to 2.

The objects mentioned above can be also accomplished by a polymer which is obtained by the reaction with a cationic nitrogen-containing compound of a polymer (A) to be obtained by polymerizing an acid group-containing monomer to a compound represented by the following formula (2):

$$R^1O\text{-}(R^2O)_n\text{-}R^3 \quad (2)$$

wherein $R^1$ and $R^3$ independently represent a hydrogen atom, a group having a carboxylic acid group or a sulfonic acid group, a linear or branched alkyl group of 1 to 4 carbon atoms, or an aryl group of 6 to 10 carbon atoms; $R^2$ represents a linear or branched alkylene of 1 to 4 carbon atoms; and n is in the range of 3 to 500.

Further, the objects mentioned above can be accomplished by a polymer which is obtained by the reaction with a cationic nitrogen-containing compound of a polymer (A) to be obtained by polymerizing an acid group-containing monomer in the presence of a monoethylenic monomer to a compound represented by the following formula (2):

$$R^1O\text{-}(R^2O)_n\text{-}R^3 \quad (2)$$

wherein $R^1$ and $R^3$ independently represent a hydrogen atom, a group having a carboxylic acid group or a sulfonic acid group, a linear or branched alkyl group of 1 to 4 carbon atoms, or an aryl group of 6 to 10 carbon atoms; $R^2$ represents a linear or branched alkylene of 1 to 4 carbon atoms; and n is in the range of 3 to 500.

This invention relates to (i) a polymer represented by the foregoing formula (1); (ii) a polymer obtained by polymerizing an acid group-containing monomer to a compound represented by the foregoing formula (2) thereby forming a polymer (A) and causing the polymer (A) to react with a cationic nitrogen-containing compound; (iii) a polymer obtained by polymerizing an acid group-containing monomer to a compound represented by the foregoing formula (2) in the presence of a monoethylenic monomer thereby forming a polymer (B) and causing the polymer (B) to react with a cationic nitrogen-containing compound; and (iv) a macromolecular solid electrolyte comprising such a polymer as an essential component. Since the polymer of this invention can retain high ion conductivity even at low temperatures, particularly at such a low temperature as of not more than 10° C., the macromolecular solid electrolyte which contains this polymer as an essential component can manifest high ion conductivity even at low temperatures.

The above and other objects, features, and advantages of the present invention will become clear from the following description of the preferred embodiments.

DESCRIPTION OF THE PREFERRED EMBODIMENTS

Now, this invention will be described in detail below.

In accordance with the first aspect, this invention is to provide a polymer represented by the foregoing formula (1). This polymer does not suffer the ion conductivity thereof to decline significantly even at such low temperatures as of not more than 10° C. and, therefore, may be suitable as a material for a macromolecular solid electrolyte which is required to permit effective use at low temperatures.

In the first aspect, the terminals of the main chain of the polymer represented by the aforementioned formula (1) do not need to be particularly discriminated. As described in detail in the following second and third aspects, for example, the terminals of the polymer of the formula (1) may be an alkoxy group ($R^1O$—) bound to the R side and a suitable substituent (—$R^3$) bound to the oxygen atom side. To be specific, the polymer of the formula (1) may be considered to be a polymer represented by the following formula:

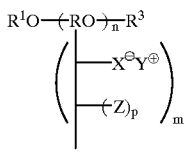

In the formula mentioned above, "$R^1$" and "$R^3$" independently represent a hydrogen atom, a group having a carboxylic acid group or a sulfonic acid group, a linear or branched alkyl group of 1 to 4 carbon atoms, or an aryl group of 6 to 10 carbon atoms. In this case, "$R^1$" and "$R^3$" may be the same or different. Where "$R^1$" and/or "$R^3$" represent a linear or branched alkyl group of 1 to 4 carbon atoms, as typical examples of the alkyl group, methyl, ethyl, propyl, isopropyl, n-butyl, isobutyl, sec-butyl and tert-butyl, cyclopropyl, and cyclobutyl maybe cited. Where "$R^1$" and/or "$R^3$" represent an aryl group of 6 to 10 carbon atoms, as typical examples of the aryl group, phenyl, o-, m-, and p-tolyl, 2,3- and 2,4-xylyl, mesityl, o-, m-, and p-cumenyl, benzyl, α-methylbenzyl, phenetyhl, styryl, cinnamyl, and naphthyl may be cited. Where "$R^1$" and/or "$R^3$" represent a group having of a carboxylic acid group (—COOH), as typical examples of this group, those monovalent groups which are produced by excluding one of hydrogen atoms directly bonded to carbon atoms of such carboxyl compounds as acetic acid, propionic acid, butyric acid, isobutyric acid, valeric acid, isovaleric acid, and pivalic acid may be cited. The position of the hydrogen atom excluded from the carboxyl compound does not need to be particularly limited but may be properly selected in consideration of desired physical properties and the ease of production. Where "$R^1$" and/or "$R^3$" represent a group having a sulfonic acid group (—$SO_3H$), as typical examples of this group, those monovalent groups which are produced by excluding one of hydrogen atoms directly bonded to carbon atoms of such compounds as methane sulfonic acid, ethane sulfonic acid, and propane sulfonic acid may be cited. The position of the hydrogen atom excluded from the compound having the sulfonic acid group does not need to be particularly limited but may be properly selected in consideration of desired physical properties and the ease of production. Among other groups cited above, a hydrogen atom, methyl, ethyl, butyl, phenyl, those monovalent groups which are produced by excluding one of the hydrogen atoms directly bonded to the carbon atoms of acetic acid, and those monovalent groups which are produced by excluding one of the hydrogen atoms directly bonded to the carbon atoms of methane sulfonic acid may prove to be preferable and a hydrogen atom, methyl, ethyl, phenyl, and those monovalent groups which are produced by excluding one of the hydrogen atoms directly bonded to the carbon atoms of acetic acid may prove to be more preferably used as "$R^1$" and/or "$R^3$".

In the aforementioned formula (1), "R" represents a linear or branched alkylene residue of 1 to 4 carbon atoms, and may include residues of such alkylene as methylene (—$CH_2$—), ethylene (—$CH_2CH_2$—), trimethylene (—$CH_2CH_2CH_2$—), propylene (—$CH(CH_3)CH_2$—) tetramethylene (—$CH_2CH_2CH_2$—$CH_2$—) 1,2-butylene (—$CH_2CH(CH_2CH_3)$—), 1,3-butylene (—$CH_2CH_2CH(CH_3)$—), and 2,3-butylene (—$CH(CH_3)CH(CH_3)$—), for example. The term "alkylene residue" as used in the specification means a group which is produced by excluding one hydrogen atom from the alkylene cited above. In the alkylene residue contemplated by this invention, the position of the hydrogen atom excluded from the alkylene does not need to be particularly limited but may be properly selected in consideration of desired physical properties and the ease of production. Among other alkylene residues cited above, ethylene residue, isopropylene residue, and 2,3-butylene residue may be preferable, ethylene residue and propylene residue may be more preferable, and ethylene residue may be particularly preferable as "R".

In the aforementioned formula (1), "$X^-$" represents a deprotonated residue of an acid such as residues having —$COO^-$ or —$SO_3^-$. As typical examples of the residue having —$COO^-$, residues of acrylic acid, methacrylic acid, crotonic acid, maleic acid, and fumaric acid may be cited. As typical examples of the residue having —$SO_3^-$, residues of 2-acrylamide-2-methyl propane sulfonic acid, sulfonic ethyl methacrylate, 3-allyloxy-2-hydroxy-propane sulfonic acid, p-styrene sulfonic acid, allyl sulfonic acid, and vinyl sulfonic acid may be cited. Among other residues cited above, the residues having —COO may be preferable, the residues of acrylic acid, methacrylic acid, maleic acid, and fumaric acid may be more preferable, and the residues of acrylic acid and methacrylic acid may be particularly preferable as "$X^-$".

Further, in the foregoing formula (1), "Z" represents a residue of a monoethylenically unsaturated compound. The term "residue of monoethylenically unsaturated compound" mentioned above may involve a residue of a monoethylenically unsaturated compound which is obtained by polymerizing one or a plurality of monoethylenically unsaturated compound components. As typical examples of the residue of the monoethylenically unsaturated compound to be used in this invention, residue of maleic acid; residue of fumaric acid; residue of maleic anhydride; residues of alkyl esters of maleic acid such as dimethyl maleate and diethyl maleate; residues of alkyl esters of fumaric acid such as dimethyl fumarate and diethyl fumarate; residues of alkyl (meth) acrylates such as methyl (meth)acrylate, ethyl (meth) acrylate, butyl (meth)acrylate, and stearyl (meth)acrylate; residues of hydroxyalkyl (meth)acrylates such as hydroxyethyl (meth)acrylate and hydroxypropyl (meth)acrylate; residues of alkenyl acetic esters such as vinyl acetate; residues of (meth)acrylonitrile, (meth)acrolein, and (meth) acrylamide; residues of dialkylaminoethyl (meth)acrylate such as dimethylaminoethyl (meth)acrylate; and residue of 2-acrylamide-2-methyl propane sulfonic acid may be cited. In consideration of the ion conductivity of the formed polymer and the ease of synthesis thereof, "Z" may be preferably any of the residues of maleic acid, fumaric acid, and maleic anhydride and particularly preferably the residue of maleic anhydride. The term "residue of monoethylenically unsaturated compound" as used in the specification is referred to as a monovalent residue which is produced by excluding one of the hydrogen atoms directly bonded to the unsaturated double bonding carbon atoms of the monoethylenically unsaturated compound.

Further, in the aforementioned formula (1), n represents the number of repeating component units, —(RO)—, forming the main chain. The number "n" is in the range of 3 to 500, preferably 5 to 100, and more preferably 5 to 50. As regards the branched chains bonded to each repeating unit of the main chain, the same branched chains may be bonded to each repeating unit or different branched chains may bonded to each repeating unit. In consideration of the ease of reaction, the same branched chains may be preferably bonded to each repeating unit. The branched chains bonded to the repeating units of the main chain do not need to be bonded to all the —(RO)— units forming the main chain and the branched chains so bonded to the —(RO)— units may be properly selected so as to suit desired characteristics such as ion conductivity. The branched chains bonded to each repeating unit of the main chain may be bonded to the —(RO)— units forming the main chain at a ratio in the range of 30 to 100%, preferably 60 to 100%, based on the total number of the repeating —(RO)— units (the total number of R's) forming the main chain. The repeating —(RO)— units forming the main chain may be one and the same type or different types. In the latter case, the repeating units may be in a blocked form or in a random form.

In the aforementioned formula (1), m represents the number of average addition mols of the branched chains including —$X^-Y^+$ and —$Z_p$ (occasionally referred to simply as "branched chain" herein below) bonded to the construction unit, —(RO)—, forming the main chain. The number "m" is in the range of 2 to 20, preferably 3 to 10. In this case, the repeating units of the branched chain including —$X^-Y^+$ and —$Z_p$ may be one and the same type or different types. In the latter case, the repeating units may be in a blocked form or a random form.

In the aforementioned formula (1), p represents the number of Z's which are bonded to one carbon in the branched chain. This number "p" is in the range of 0 to 2. Further, in this invention, the order in which the components of the branched chain of —$X^-Y^+$ and —$Z_p$ are bonded in the repeating unit of the branched chain bonded to each repeating unit of the main chain does not need to be limited to that which is described in the formula (1). These components may be in the order of —$Z_p$ and —$X^-Y^+$ from the main chain side. Also when a plurality of Z's are present in the repeating unit forming one branched chain (namely, when p in the formula (1) is 1 or 2), though the order in which the components of the branched chain of —$X^-Y^+$ and —$Z_p$ are bonded do not need to be particularly limited, the components may be preferably in the order of —$X^-Y^+$ and —$Z_p$ from the main chain side.

In the aforementioned formula (1), "$Y^+$" represents a cation of a nitrogen-containing compound. Preferably, the cation of the nitrogen-containing compound may be a quaternary ammonium ion.

In this invention, the structure of the quaternary ammonium ion does not need to be particularly discriminated. The cations represented by the following formulas may be cited as typical examples thereof.

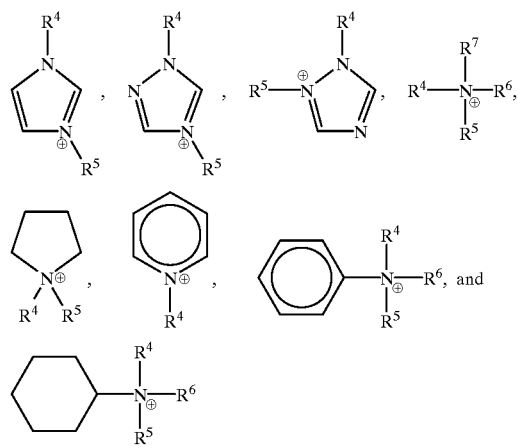

The quaternary ammonium ions may have such a ring structure as an imidazol ring, a triazole ring, a pyrrolidine ring, a pyridine ring, a cyclohexane ring, and a benzene ring, or such a ring structure additionally having a halogen atom or a substituent. As typical examples of the substituent which can be used in this case, alkyl groups of 1 to 10 carbon atoms, preferably 1 to 4 carbon atoms, such as methyl, ethyl, propyl, isopropyl, n-butyl, isobutyl, sec-butyl, tert-butyl, cyclopropyl, and cyclobutyl; and halogen atoms such as fluorine, chlorine, bromine, and iodine atoms may be cited. Among other substituents cited above, a fluorine atom can be preferably used.

Among other quaternary ammonium ions cited above, the quaternary ammonium ions represented by the following formulas can be particularly preferably used in this invention.

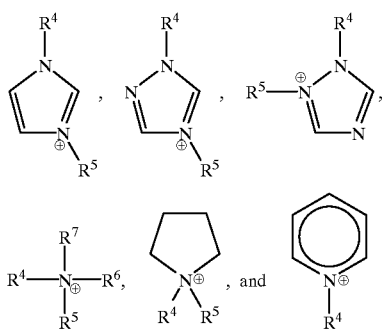

In the formulas as shown above, $R^4$, $R^5$, $R^6$, and $R^7$ independently represent a linear or branched alkyl group of 1 to10 carbon atoms such as methyl, ethyl, propyl, cyclopropyl, isopropyl, n-butyl, isobutyl, sec-butyl, tert-butyl, cyclobutyl, pentyl isopentyl, tert-pentyl, neopentyl, cyclopentyl, hexyl, isohexyl, cyclohexyl, heptyl, octyl, nony, and decyl. Preferably, "$R^4$", "$R^5$", "$R^6$", and "$R^7$" independently may represent a linear or branched alkyl group of 1to 4 carbon atoms such as methyl, ethyl, propyl, isopropyl, n-butyl, isobutyl, sec-butyl, and tert-butyl.

The polymer of the formula (1) contemplated by this invention may preferably have a glass transition point (occasionally referred to simply as "Tg" in the specification) of not more than $-30°$ C., preferably not more than $-50°$ C. When the polymer having such a low glass transition point is used, for example, in an electrolyte, since the polymer is in a soft elastomeric viscous state even at fairly low temperatures, the electrolyte containing this polymer can effectively prevent the ion conductivity thereof from declining even at low temperatures. On the other hand, if the glass transition point of the polymer exceeds $-30°$ C., the electrolyte containing this polymer, though showing high ion conductivity at room temperature, would be at a disadvantage in suffering the ion conductivity to be abruptly declined when used at a low temperature.

In accordance with the second aspect, this invention is to provide a polymer which is obtained by polymerizing a monomer having an acid group to a compound represented by the following formula (2):

$$R^1O\text{—}(\text{—}R^2O)_n\text{—}R^3 \quad (2)$$

to obtain a polymer (A), and causing the polymer (A) to react with a cationic nitrogen-containing compound. The aforementioned reaction in accordance with the second aspect can be advantageously used for the production of the polymer of the formula (1) wherein p in the formula is 0.

In accordance with the third aspect, this invention is to provide a polymer which is obtained by polymerizing a monomer having an acid group to a compound represented by the above-mentioned formula (2) in the presence of a monoethylenic monomer to obtain a polymer (B), and causing the polymer (B) to react with a cationic nitrogen-containing compound. The aforementioned reaction in accordance with the third aspect can be advantageously used for the production of the polymer of the formula (1) wherein p in the formula is 1 or 2.

In the second and third aspects, "$R^1$" and "$R^3$" and "n" representing the number of repeating units forming the main chain in the formula (2) have the same definitions as in the first aspect as mentioned above.

In the aforementioned formula (2), "$R^2$" represents a linear or branched alkylene of 1 to 4 carbon atoms, such as methylene, ethylene, trimethylene, propylene, tetramethylene, 1,2-butylene, 1,3-butylene, and 2,3-butylene. Among other alkylenes, ethylene, isopropylene, and 2,3-butylene may prove to be preferable, ethylene and propylene may prove to be more preferable, and ethylene may prove to be particularly preferable for "$R^2$".

The compound of the formula (2) which is used as the raw material in the second and third aspects of this invention can be produced in the same manner as by conventional method. The compound of the formula (2) to be used as the raw material can be obtained, by example, by polymerizing an alkylene oxide by a well-known method using water or an alcohol as an initiator, alcoholating the resultant polymer, and subsequently causing the alcoholated polymer to react with an alkyl chloride or aryl chloride thereby substituting a $\text{—}OR^1$ group and a $\text{—}R^3$ group for the opposite terminals of the resultant polymer. As typical examples of the alkylene oxide, ethylene oxide, trimethylene oxide, propylene oxide, tetrahydrofuran, 1,2-butylene oxide, 1,3-butylene oxide, and butylene oxide may be cited. Preferably, ethylene oxide, propylene oxide, and butylene oxide, more preferably ethylene oxide and isopropylene oxide, and most preferably ethylene oxide can be used as the alkylene oxide. As typical examples of the alcohol to be used for obtaining the compound of the formula (2), primary alcohols of 1 to 22 carbon atoms such as methanol, ethanol, n-propanol, and n-butanol; secondary alcohols of 3 to 18 carbon atoms; tertiary alcohols such as t-butanol; diols such as ethylene glycol, diethylene glycol, propane diol, butane diol, and propylene glycol; triols such as glycerin and trimethylol propane; and polyols such as sorbitol may be cited.

The compound of the formula (2) which can be obtained as described above may be a compound having an alkylene oxide as the structural unit thereof and having a number average molecular weight of preferably not less than 200, more preferably not less than 500, and most preferably not less than 1000. Though the molecular weight does not have any specific upper limit, it may be preferably not more than 20,000.

The expression "monomer having an acid group" to be used as the raw material in the second and third aspects of this invention are referred to as a monomer which contains an acid group and a polymerizable double bond in the molecular unit thereof. This monomer does not need to be particularly discriminated on account of the kind. Monomers having a carboxylic acid group (—COOH) or a sulfonic acid group (—$SO_3H$) as an acid group may be cited, for example. As typical examples of the monomer having a carboxylic acid group as an acid group, acrylic acid, methacrylic acid, crotonic acid, maleic acid, and fumaric acid may be cited. As typical examples of the monomer having a sulfonic acid group as an acid group, 2-acrylamide-2-methyl propane sulfonic acid, sulfonic ethyl methacrylate, 3-allyloxy-2- hydroxy-propane sulfonic acid, p-styrene sulfonic acid, allyl sulfonic acid, and vinyl sulfonic acid may be cited. Among other monomers cited above, preferably the monomers having a carboxylic acid group as an acid group, more preferably acrylic acid, methacrylic acid, maleic acid, and fumaric acid, and particularly preferably acrylic acid and methacrylic acid may be used.

The cationic nitrogen-containing compound to be used for the reaction with the polymer (A) or (B) in the second and third aspects of this invention does not need to be particularly discriminated but is only required to be capable of reacting with the polymer (A) or (B) to consequently obtain the polymer aimed at. Any of known cationic nitrogen-containing compounds may be used. Specifically, compounds having a quaternary ammonium ion (a quaternary ammonium salt) may be cited. The quaternary ammonium ion does not need to be particularly discriminated. The cations represented by the following formulas may be cited, for example.

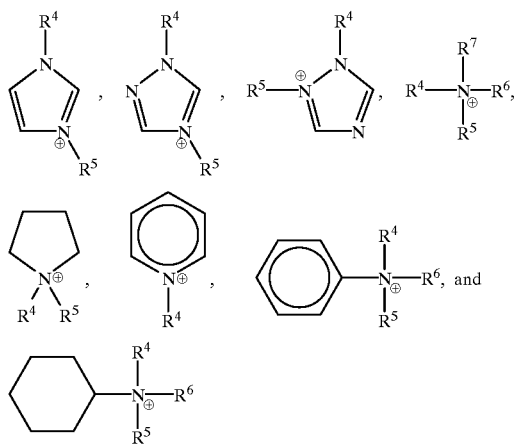

Among other compounds cited above, the compounds having the quaternary ammonium ions represented by the following formulas may be preferably used as the cationic nitrogen-containing compound.

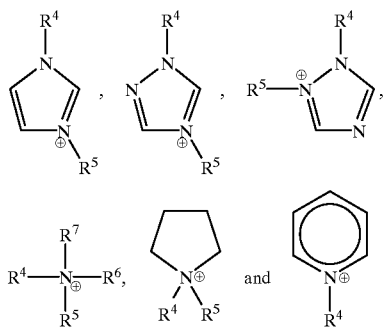

The definitions for "$R^4$", "$R^5$", "$R^6$", and "$R^7$" are the same as those described above with respect to the quaternary ammonium ion and will be omitted herein.

As typical examples of the cationic nitrogen-containing compound (quaternary ammonium salt), N,N-dibutyl imidazolium bromide, N,N-diethyl imidazolium bromide, N,N-dipropyl imildazolium bromide, N-ethyl-N-methyl imidazolium bromide, N-ethyl-N-butyl imidazolium bromide, N-butyl-N-propyl imidazolium bromide, N-ethyl-N-propyl imidazolium bromide, 2,4-diethyl triazol bromide, 2-ethyl-4-propyl triazol bromide, 2-ethyl-4-butyl triazol bromide, N-ethyl-N-propyl imidazolium bis(trifluoromethanesulfonyl) imide, N,N-dibutyl imdazolium bis(trifluoromethanesulfonyl) imide, N,N-diethyl imidazolium bis(trifluoromethanesulfonyl) imide, N,N-dipropyl imidazolium hexafluorophosphate, N-ethyl-N-methyl imidazolium perchlorate, N-ethyl-N-butyl imidazolium tetrafluoroborate, and N-butyl-N-propyl imidazoiumbis (trifluoromethanesulfonyl) imide may be cited. Among other cationic nitrogen-containing compounds cited above, N,N-dibutyl imidazolium bromide, N-ethyl-N-n-propyl imidazolium bis(trifluoromethanesulfonyl) imide, and N,N-dibutyl imidazolium bis(trifluoromethanesulfonyl) imide may be preferably used.

In this invention, the cationic nitrogen-containing compound (quaternary ammonium salt) can be react with the monomer having the acid group to consequently form a quaternary ammonium ion represented by the aforementioned symbol "$Y^+$" according to this invention. The method for producing the cationic nitrogen-containing compound (quaternary ammonium salt) does not need to be particularly discriminated. Any of known methods for the production of the compound may be used. The production, for example, can be attained by causing an alkyl halide to react with a tertiary amine. In this reaction, the tertiary amine in the aqueous solution thereof at 25° C. may have pKa (a negative logarithm based on 10 of a dissociation constant of an acid) preferably in the range of 5 to 12, more preferably in the range of 5 to 10, and most preferably in the range of 5 to 8. If the pKa of the tertiary amine in the aqueous solution thereof at 25° C. is less than 5, the shortage would be at a disadvantage in compelling the solution to acquire too weak basicity to allow the impartation of fully satisfactory cationic properties to "$Y^+$". In contrast, if the pKa of the tertiary amine in the aqueous solution thereof at 25° C. exceeds 12, the excess would be likewise at a disadvantage in suffering the basicity to become excessively strong and conversely lowering the ion conductivity, particularly the ion conductivity at low temperatures.

The tertiary amine to be used for the reaction with an alkyl halide can be properly decided depending on the basic structure of the desired quaternary ammonium salt. Further, the alkyl halide to be used for the reaction can be also decided properly depending on the substituent at the protonated site in the structure of the desired quaternary ammonium salt. The alkyl halide maybe represented by the formula: AB, wherein A represents a linear or branched alkyl of 1 to 10 carbon atoms, preferably a linear or branched alkyl of 1 to 4 carbon atoms (such as methyl, ethyl, propyl, isopropyl, n-butyl, isobuty, sec-butyl, and tert-butyl) and B represents a halogen atom such as a fluorine atom, a chlorine atom, a bromine atom, or an iodine atom, preferably a bromine atom.

The reaction of the tertiary amine with the alkyl halide may be carried out either in the presence of a solvent or in the absence of a solvent. In consideration of the advance of the reaction, however, it may preferably proceed in a solvent. The solvent to be used when the reaction is carried out in a solvent does not need to be particularly discriminated but may be any of known solvents which fit for the reaction. The solvent may preferably easily dissolve the tertiary amine and alkyl halide as the raw materials to homogeneously retain the reaction system. As typical examples of the solvent which can be advantageously used herein, chloroform, 1,2-dichloroethane, 1,1,1-trichloroethane, dimethyl formamide (DMF), and dimethyl sulfoxide (DMSO) may be cited. among other solvents cited above, 1,2-dichloroethane and 1,1,1-trichloroethane are preferably used.

The conditions for the reaction of the tertiary amine with the alkyl halide do not need to be particularly limited but are only required to ensure efficient progress of the reaction. For example, the reaction temperature may be generally in the range of 50 to 200° C. and the reaction time may be generally in the range of 2 to 10 hours, although variable with the kinds and amounts of the raw materials and other reaction conditions. The reaction may be carried out under normal pressure, increased pressure, or reduced pressure. In consideration of factors of equipment, the reaction can be preferably carried out under normal pressure.

In this invention, the quaternary ammonium salt which provides the cation "$Y^+$" is limited to a halogen atom in the case of using the method of production as mentioned above. The use of an anion other than the halogen atom is also permissible. As typical examples of the anion which is usable herein, anion of bis(trifluoromethanesulfonyl) imide, hexafluorophosphate anion, perchlorate anion, and tetrafluoroborate anion may be cited. Such an anion can be introduced into a quaternary ammonium salt by causing a quaternary ammonium salt containing a halogen atom synthesized by the method of production mentioned above as an anion to react with a lithium salt containing the anion.

The monoethylenic monomer in the presence of which the reaction for polymerizing the monomer having an acid group to the compound of the formula (2) in the third aspect of the invention can be properly selected in accordance with the residue "Z" in the formula (1). As typical examples of the monoethylenic monomer, maleic acid; fumaric acid; maleic anhydride; alkyl esters of maleic acid such as dimethylmaleate and diethyl maleate; alkyl esters of fumaric acid such as dimethyl fumarate and diethyl fumarate; alkyl (meth) acrylates such as methyl (meth)acrylate, ethyl (meth) acrylate, butyl (meth)acrylate, and stearyl (meth)acrylate; hydroxyalkyl (meth)acrylates such as hydroxyethyl (meth) acrylate and hydroxypropyl (meth)acrylate; alkenyl esters of acetic acid such as vinyl acetate; aromatic vinyls such as styrene; (meth)acrylonitrile, (meth)acrolein, and (meth) acrylamide; dialkylaminoethyl (meth)acrylates such as dimethylaminoethyl (meth)acrylate; and 2-acrylamide-2-methyl propane sulfonic acid may be cited. From the group of monoethylenic monomers cited above, one member or a combination of two or more members may be properly selected to suit the structure of the branched chain of the polymer expected to be obtained. Among other monoethylenic monomers, preferably maleic acid, fumaric acid, and maleic anhydride, and particularly preferably maleic anhydride can be used in consideration of the ion conductivity of the produced polymer.

The method for polymerizing the monomer having an acid group to a compound of the formula (2) optionally in the presence of a monoethylenic monomer in the second and third aspects of this invention does not need to be particularly restricted. When the acid group of the monomer having an acid group is a carboxyl group (—COOH), for example, a method similar to the methods disclosed in EP-A-639,592 and EP-A-850,963 can be used. When the acid group of the monomer having an acid group is a sulfonic acid group (—SO$_3$H), for example, a method similar to the method disclosed in these official gazettes can be used, except for using a monomer having a sulfonic acid group in place of the monomer having the carboxyl group.

Now, one preferred embodiment of the method for the polymerization wherein a monoethylenic monomer is used and a monomer having an acid group is (meth)acrylic acid having a carboxyl group as an acid group will be shown below.

A polymer aimed at can be obtained by polymerizing a monomer component (b) consisting of 40 to 100 mol % of (meth)acrylic acid (b1) and 60 to 0 mol % of a monoethylenic monomer (b2) to a compound (a) of the formula (2) in the amount of not less than 25 mass % based on the mass of the compound (a) in the presence of a polymerization initiator substantially in the absence of a solvent at a temperature of not less than 100° C. In the second aspect of this invention which omits the use of a monoethylenic monomer, a polymer aimed at may be obtained by polymerizing (meth)acrylic acid onto a compound (a) of the formula (2) in an amount of not less than 25 mass % based on the mass of the compound (a) in the presence of a polymerization initiator substantially in the absence of a solvent at a temperature of not less than 100° C.

In the case of the third aspect which uses a monoethylenic monomer (b2) in combination with (meth)acrylic acid (b1), a procedure which comprises mixing not less than half of the amount (not less than 50 mass %) of the monoethylenic monomer (b2) in advance with the compound (a), then adding to the resultant mixture the monomer component (b) consisting of (meth)acrylic acid (b1) and the remainder of the monoethylenic monomer (b2) and a polymerization initiator, and polymerizing the produced mixture may be particularly advantageously used.

Where the monoethylenic monomer (b2) is a monomer having a carboxyl group, the copolymerizing ratio of the (meth)acrylic acid (b1) and the monoethylenic monomer (b2) in the monomer component (b) may be preferably such that the copolymerizing ratio of (b1) is in the range of 40 to 100 mol % and that of (b2) in the range of 60 to 0 mol %. Where the monoethylenic monomer (b2) is a monomer having no carboxyl groups, the copolymerizing ratio may be preferably such that the copolymerizing ratio of (b1) is in the range of 80 to 100 mol % and that of (b2) in the range of 20 to 0 mol %. In the latter case, if the ratio accounted for by the (meth)acrylic acid is less than 80 mol %, the shortage would be at a disadvantage in lowering the density of the carboxylic acid in the produced polymer and rendering the ion conductivity insufficient. When the monomer (b2) has the carboxyl group such as maleic acid, fumaric acid, and maleic anhydride, a decrease of the ratio of the (meth)acrylic acid below 40 mol % would bring a problem of degrading the ratio of introduction of maleic acid, fumaric acid, and maleic anhydride into the polymer and increasing the amount of the residual monomer, though the produced polymer would not induce any decline of the carboxylic acid density.

In this invention, the polymerization may be preferably carried out in the presence of a polymerization initiator with a solvent substantially used.

As the polymerization initiator, though any of known radical initiators can be used, it is particularly advantageous to use an organic peroxide. As typical examples of the organic peroxide, ketone peroxides such as methylethyl ketone peroxide and cyclohexanone peroxide; hydroperoxides such as t-butyl hydroperoxide, cumene hydroperoxide, diisopropyl benzene hydroperoxide, p-menthane hydroperoxide, 2,5-dimethylhexane-2,5-dihydroperoxide, and 1,1,3,3-tetrabutyl hydroperoxide; dialkyl peroxides such as di-t-butyl peroxide, t-butyl cumyl peroxide, dicumyl peroxide, α,α'-bis(t-butylperoxy) p-diisopropyl benzene, and α,α'-bis (t-butylperoxy) p-diisopropyl hexyne; peroxy esters such as t-butylperoxy acetate, t-butylperoxy laurate, t-butylperoxy benzoate, di-t-butyl peroxy isophthalate, 2,5-dimethyl-2,5-di(benzoylperoxy) hexane, and t-butylperoxy ipropyl carbonate; peroxy ketals such as n-butyl-4,4-bis(t- butylperoxy)valeate, 2,2-bis(t-butylperoxy) butane; and diacyl peroxides such as dibenzoyl peroxide may be cited. Among other polymerization initiators cited, di-t-butyl peroxide and t-butyl peroxy benzoate can be advantageously used as the polymerization initiator.

Though the amount of the polymerization initiator to be used does not need to be particularly restricted, it may be preferably in the range of 0.1 to 15 mass %, and more preferably 0.5 to 10 mass %, based on the mass of the monomer component (b). If the amount of the polymerization initiator deviates from the range mentioned above, the polymerization efficiency of the monomer component (b) to the compound (a) would be lowered. Though the polymerization initiator may be added in advance to the compound (a), it can be added thereto simultaneously with the monomer component (b).

In this invention, when water, an alcohol, or an organic solvent such as toluene is used in the polymerization, the polymerization efficiency of the monomer component (b) to the monomer component (a) would be degraded. The polymerization, therefore, may be preferably carried out substantially in the absence of a solvent. When a solvent is used for the purpose of facilitating the addition of the polymerization initiator or the monomer, it is commendable to minimize the amount of the solvent used, preferably to decrease the amount used to not more than 5 mass % based on the total mass of the reaction system, or to expel by distillation the solvent immediately after the addition thereof from the reaction system.

The polymerization temperature may be not less than 100° C, preferably in the range of 110° C. to 160° C. If the polymerization temperature is lower than 100° C., the polymerization efficiency of the monomer component (b) to the compound (a) would be lowered. Conversely, if the polymerization temperature exceeds 160° C., the excess would have a possibility of inducing the thermal decomposition of the compound (a) and the polymers (A) and (B) consequently obtained.

In the polymerization contemplated by this invention, a part or a whole of the compound (a) may be preferably incorporated into the reaction system during the initial stage thereof. Where at least one member selected from the group consisting of maleic acid, fumaric acid, and maleic anhydride is used as the monoethylenic monomer (b2), not less than one half of the amount of the monoethylenic monomer (b2) may be preferably incorporated together with the compound (a) to the reaction system during the initial state of the reaction. Then, the remainder of the monomer and the polymerization initiator may be separately added dropwise to the reaction system after the compound (a) has been heated to a temperature of not less than 100° C. When a part of the compound (a) is incorporated into the reaction system during the initial state of the reaction, the remainder of the compound (a) may be added dropwise as mixed with the initiator or the monomer.

Though the average molecular weights of the polymers (A) and (B) produced as described above do not need to be particularly restricted, they may be generally in the range of 1,000 to 100,000, preferably 1,000 to 50,000, and more preferably 1,000 to 30,000.

Then, the polymers (A) and (B) produced as described above may be further reacted with a cationic nitrogen-containing compound to give rise to the polymers aimed at by this invention. While it has been heretofore to mix a monomer with a compound capable of imparting a cation, polymerize the resultant mixture, and put the produced polymer in the unmodified form to use for an electrolyte, the present invention is characterized by preparatorily producing a polymer having an acid group moiety ("X" in the formula (2)), then causing the polymer with a cationic nitrogen-containing compound thereby forming a polymer containing $—X^-Y^+$, and using the produced polymer for an electrolyte.

Though the reaction of the polymer (A) or (B) with the cationic nitrogen-containing compound may be carried out either in a solvent or in the absence of a solvent, the reaction may be preferably carried out in a solvent in consideration of the progress thereof. The solvent to be used when the reaction is performed in a solvent does not need to be particularly limited but may be any of known solvents which fit for the reaction. Such a solvent may be preferably selected as that the polymers (A) and (B) and the cationic nitrogen-containing compound can be easily dissolved therein to retain the reaction system homogeneously; it can be easily removed after completion of the reaction; and hydrogen halide to be generated during the course of the reaction can be hardly dissolved therein. As typical examples of the solvent that answers this description, chloroform, dichloromethane, acetone, acetonitrile, toluene, diisopropyl ether, methylethyl ketone, tetrahydrofuran, 1,2-dimethoxy ethane, and ethyl acetate may be cited. Among other solvents cited above, chloroform, acetone, acetonitrile, and tetrahydrofuran may be used particularly advantageously.

In this invention, the reaction conditions of the polymers (A) or (B) and the cationic nitrogen-containing compound do not need to be particularly limited but are only required to permit the efficient progress of the reaction. For example, the reaction temperature may be generally in the range of room temperature to 80° C. and preferably in the range of room temperature to 40° C., and the reaction time may be generally in the range of 2 to 50 hours, though variable with the kinds and amounts of the raw materials and other reaction conditions. The reaction may be carried out under normal pressure, increased pressure, or reduced pressure. In consideration of factors of equipment, the reaction may be preferably carried out under normal pressure.

The polymer obtained as described above may have a Tg of not more than −30° C., preferably not more than −50° C. and, therefore, can be in a viscous state resembling a soft elastomer even at relatively low temperature, and exhibit outstanding ion conductivity in a wide range of temperatures, particularly at low temperatures. The polymers of the second and third aspects of this invention, therefore, can be advantageously used for an electrolyte, particularly for an electrolyte for a lithium secondary cell and a gel electrolyte.

In accordance with the fourth aspect, this invention is to provide a macromolecular solid electrolyte containing the polymer of this invention as an essential component.

The macromolecular solid electrolyte of this invention may use either one species of the polymer of this invention or two or more species of the polymer in the form of a mixture. The content of the polymer of this invention in the macromolecular solid electrolyte does not need to be particularly limited so long as that the macromolecular solid electrolyte can exhibit outstanding ion conductivity in a wide range of temperatures, particularly at low temperatures. The content of the polymer may be generally in the range of 30 to 95 mass %, preferably 50 to 90 mass %, based on the total mass of the macromolecular solid electrolyte. If the content of the polymer is less than 30 mass %, the shortage would be at a disadvantage in preventing the polymer from manifesting ion conductivity fully satisfactorily. Conversely, if the content of the polymer exceeds 95 mass %, the excess would be likewise at a disadvantage in failing to bring the proportionate addition to the effects thereby and consequently rendering the reaction unfavorable economically and extremely decreasing the amount of the lithium salt to be added.

The macromolecular solid electrolyte of this invention may contain a lithium salt as described in detail below. The lithium salt forming the macromolecular solid electrolyte of this invention may be any of lithium salts which have been used effectively in conventional macromolecular solid electrolytes. As typical examples of the lithium salt which can be used effectively herein, inorganic lithium salts such as LiF, LiBr, LiCl, LiI, LiOH, LiSCN, $LiBf_4$, $LiAsF_6$, $LiClO_4$, $LiHgI_3$, $LiPF_6$, $LiSbF_6$, and $LiNbF_6$; and organic lithium salts such as $CF_3COOLi$, $(CF_3CO)_2NLi$, $CF_3SO_3Li$, $C_4F_9SO_3Li$, $C_6H_5SO_3Li$, $C_8F_{17}SO_3Li$, $(CF_3SO_2)_2NLi$, $(C_2F_5SO_2)_2NLi$, $(C_4F_9SO_2)(CF_3SO_2)NLi$ $(C_6F_5SO_2)(CF_3SO_2)NLi$, $(C_8F_{17}SO_2)(CF_3SO_2)NLi$, $(CF_3CH_2OSO_2)_2NLi$, $(CF_3CF_2CH_2OSO_2)_2NLi$, $[(CF_3)_2CHOSO_2]_2NLi$, $(CF_3SO_2)_3CLi$, and $[(CF_3)_2C_6H_3-3,5]_4Li$ may be cited. Among other lithium salts cited above, such lithium salts as $(CF_3SO_2)_2NLi$ and $(C_2FS_5SO_2)_2NLi$ can be used particularly advantageously for the macromolecular solid electrolyte of this invention. In this case, these lithium salts may be used singly or in the form of a mixture of two or more members. The amount of the lithium salt to be used may be generally in the range of 5 to 70 mass %, preferably 10 to 70 mass %, and more preferably 10 to 50 mass %, based on the mass of the polymer of this invention. If the amount of the lithium salt to be used is less than 5 mass %, the shortage would be at a disadvantage in bringing the shortage in the number of dissociated lithium ions and lowering the lithium ion conductivity. Conversely, if the amount of the lithium salt to be used exceeds 70 mass %, the excess would be likewise at a disadvantage in strengthening the interaction between the lithium salt and the polymer, decreasing the number of dissociated lithium ions or increasing the viscosity of the reaction system, and consequently bringing the decline in the ion conductivity.

As another component to be added to the macromolecular solid electrolyte of this invention besides the polymer and the lithium salt, any of known additives may be similarly used. The component so added is preferred to be capable of exalting various characteristics of the macromolecular solid electrolyte such as ion conductivity and mechanical strength. As typical examples of the component which can be used effectively herein, plasticizers such as ethylene carbonate, propylene carbonate, γ-butyrolactone, acetonitrile, sulfolane, DMSO, DMF, dimethoxyethane, methyl acetate, methyl propionate, dimethyl carbonate, diethyl carbonate, and ethylmethyl carbonate; organic fine particles formed of cross-linked acrylic resin, PMMA resin, fluorine resin, vin(lidene fluoride resin, benzoguanamine resin, silicon resin, epoxy resin, nylon, polystyrene resin, cross-linked polystyrene resin, phenol resin, melamine resin, polyolefin resin, polyethylene resin, polyacrylonitrile resin, cross-linked polyacrylonitrile resin, and cellulose; and inorganic fine particles formed of such ceramics of oxides, carbides, nitrides, and borides of metals may be cited. The content of the other additive to be used additionally in this case does not need to be particularly restricted but is only required to be capable of bringing the appreciable improvement in the various characteristic properties as mentioned above. It may be generally in the range of 2 to 80 mass %, preferably 5 to 50 mass %, based on the mass of the polymer.

The solvent to be used in the method for the production of the macromolecular solid electrolyte contemplated by this invention does not need to be particularly restricted. Any of known solvents that fit for the production can be used. It may be preferable to select such a solvent as that it permits the easy dissolution of the polymer and the lithium salt so as to ensure the production of a homogeneous reaction system and allow the easy removal from the reaction system at the end of the reaction. The solvent may be properly selected to suit the purpose of use with a view to precluding possibilities that the solvent would persist in a minute amount in the reaction system to degrade the performance of the produced cell. As typical examples of the solvent which can be effectively used herein, tetrahydrofuran, dimethoxyethane, dioxolane, acetonitrile, dimethyl formamide, chloroform, acetone, methanol, ethanol, isopropanol, butanol, 1,2-dichloroethane, dichloromethane, dioxane, ethyl acetate, and toluene may be cited. Among other solvents cited above, tetrahydrofuran, acetone, and chloroform can be particularly advantageously used.

The method for the production of the macromolecular solid electrolyte contemplated by this invention does not need to be limited. Any of known methods that fit for the production can be used. For example, a method which comprises dissolving the polymer of this invention and the lithium salt in the solvent and then removing the solvent from the reaction system may be used. The method for removing the solvent in this case does not need to be particularly limited. Any of conventional methods such as removal by volatilization, distillation, and aspiration under reduced pressure may be similarly used. Of these methods, the removal by volatilization can be advantageously used to remove the solvent.

The macromolecular solid electrolyte of this invention can excel in ion conductivity and be applied to various uses. For example, it may be usable as an electrolyte for a lithium secondary cell in its unmodified form of the solid electrolyte or in the form of a gel electrolyte which results from absorbing a proper solvent. In addition, the macromolecular solid electrolyte of this invention may be also usable as materials for electrochemical devices such as a diaphragm for an ion electrode, a capacitor for aluminum electrolytic capacitor, and a sensor.

Now, this invention will be described more specifically below with reference to working examples. This invention should not be limited by these working examples.

Referential Example 1: Synthesis of polymer (B1)

In a glass reaction vessel provided with a thermometer, a stirrer, a nitrogen inlet tube, and a reflux condenser, 70 g of monomethoxypolyethylene glycol having an average molecular weight of 500 and 18.9 g of maleic anhydride were placed, thermally melted and mixed therein as swept with a nitrogen gas, and heated with stirred to 145° C. Then, the hot mixture consequently formed was kept at a temperature in the range of 145 to 147° C. and 23 g of acrylic acid and 11.1 g of di-t-butyl peroxide were separately added continuously dropwise to the heated mixture over a period of one hour. Thereafter, they were continuously stirred for additional one hour, to obtain a polymer (B1). The polymer (B1) thus obtained had an average molecular weight of 2,650.

Referential Example 2: Synthesis of polymer (B2)

In a glass reaction vessel provided with a thermometer, a stirrer, a nitrogen inlet tube, and a reflux condenser, 70 g of monophenoxypolyethylene glycol having an average molecular weight of 1000 and 7 g of maleic anhydride were placed, thermally melted and mixed therein as swept with a nitrogen gas, and heated with stirred to 145° C. Then, the hot mixture consequently formed was kept at a temperature in the range of 145 to 147° C. and 23 g of acrylic acid and 1.7 g of di-t-butyl peroxide were separately added continuously dropwise to the heated mixture over a period of one hour. Thereafter, they were continuously stirred for additional one hour, to obtain a polymer (B2). The polymer (B2) thus obtained had an average molecular weight of 3,400.

Referential Example 3: Synthesis of polymer (B3)

In a glass reaction vessel provided with a thermometer, a stirrer, a nitrogen inlet tube, and a reflux condenser, 70 g of monomethoxy triethylene glycol and 10.7 g of maleic anhydride were placed, thermally melted and mixed therein as swept with a nitrogen gas, and heated with stirred to 145° C. Then, the hot mixture consequently formed was kept at a temperature in the range of 145 to 147° C. and 19.3 g of acrylic acid and 7.2 g of di-t-butyl peroxide were separately added continuously dropwise to the heated mixture over a period of one hour. Thereafter, they were continuously stirred for additional one hour, to obtain a polymer (B3). The polymer (B3) thus obtained had an average molecular weight of 2,400.

Referential Example 4: Synthesis of polymer (B4)

In a glass reaction vessel provided with a thermometer, a stirrer, a nitrogen inlet tube, and a reflux condenser, 80 g of polyethylene glycol biscarboxymethyl ether having an average molecular weight of 600 and 12.2 g of maleic anhydride were placed, thermally melted and mixed therein as swept with a nitrogen gas, and heated with stirred to 145° C. Then, the hot mixture consequently formed was kept at a temperature in the range of 145 to 147° C. and 22.1 g of acrylic acid and 10.1 g of di-t-butyl peroxide were separately added continuously dropwise to the heated mixture over a period of one hour. Thereafter, they were continuously stirred for additional one hour, to obtain a polymer (B4). The polymer (B4) thus obtained had an average molecular weight of 3,200.

Referential Example 5: Synthesis of polymer (A1)

In a glass reaction vessel provided with a thermometer, a stirrer, a nitrogen inlet tube, and a reflux condenser, 57.9 g of dimethoxy polyethylene glycol having an average molecular weight of 500 was placed, heated therein as swept with a nitrogen gas, and heated with stirred to 145° C. Then, the hot solution consequently formed was kept at a temperature in the range of 145 to 147° C. and 42.1 g of acrylic acid and 11.1 g of di-t-butyl peroxide were separately added continuously dropwise to the heated mixture over a period of one hour. Thereafter, they were continuously stirred for additional one hour, to obtain a polymer (A1). The polymer (A1) thus obtained had an average molecular weight of 3,000.

Referential Example 6: Synthesis of polymer (B5)

In a glass reaction vessel provided with a thermometer, a stirrer, a nitrogen inlet tube, and a reflux condenser, 125 g of dimethoxy polyethylene glycol having an average molecular weight of 500 and 17.96 g of maleic anhydride were placed, thermally melted and mixed therein as swept with a nitrogen gas, and heated as stirred to 145° C. Then, the hot solution consequently formed was kept at a temperature in the range of 145 to 147° C. and 64.62 g of acrylic acid and 5.36 g of di-t-butyl peroxide were separately added continuously dropwise to the heated mixture over a period of one hour and then 17.96 g of maleic anhydride was further added thereto. Thereafter, they were continuously stirred for additional one hour, to obtain a polymer (B5). The polymer (B5) thus obtained had an average molecular weight of 2,150.

EXAMPLE 1

Synthesis of polymer (1)

In a three-neck flask having an inner volume of 200 ml and provided with a reflux tube, 4 g of the polymer (B1) synthesized in Referential Example 1, 4.4 g of N,N-diethyl imi(dazolium bromide, and 100 ml of chloroform were placed and stirred to be completely dissolved therein. The solution as kept bubbled with an argon gas was left reacting at room temperature (20° C.) for four hours.

After the reaction was completed, the reaction solution was distilled in an evaporator to expel chloroform. The residue was thoroughly dried in a vacuum drier (30° C., 1 mmHg) over a period of 40 hours, to obtain 6.8 g of a polymer (1). When the resultant polymer (1) was thermally analyzed with a differential scanning calorimeter, it was found to have a glass transition point of −55.5° C.

EXAMPLE 2

Synthesis of polymer (2)

In a three-neck flask having an inner volume of 200 ml and provided with a reflux tube, 4.3725 g of the polymer (B1) synthesized in Referential Example 1, 6.117 g of N,N-dibutyl imidazolium bromide, and 100 ml of chloroform were placed and stirred to be completely dissolved therein. The solution as kept bubbled with an argon gas was left reacting at room temperature (20° C.) for 18 hours, heated to 50° C., and further left reacting for 5 hours.

After the reaction was completed, the reaction solution was distilled in an evaporator to expel chloroform. The residue was thoroughly dried in a vacuum drier (60° C., 1 mmHg) over a period of 40 hours, to obtain 8.2 g of a polymer (2). When the resultant polymer (2) was thermally analyzed with a differential scanning calorimeter, it was found to have a glass transition point of −54.7° C.

EXAMPLE 3

Synthesis of polymer (3)

In a three-neck flask having an inner volume of 200 ml and provided with a reflux tube, 3 g of the polymer (B1) synthesized in Referential Example 1, 4.28 g of triethylhexyl ammonium bromide, and 100 ml of chloroform were placed and stirred to be completely dissolved therein. The solution as kept bubbled with an argon gas was left reacting at room temperature (20° C.) for 48 hours.

After the reaction was completed, the reaction solution was distilled in an evaporator to expel chloroform. The residue was thoroughly dried in a vacuum drier (60° C., 1 mmHg) over a period of 40 hours, to obtain 6.1 g of a polymer (3). When the resultant polymer (3) was thermally analyzed with a differential scanning calorimeter, it was found to have a glass transition point of −53.8° C.

EXAMPLE 4

Synthesis of polymer (4)

In a three-neck flask having an inner volume of 200 ml and provided with a reflux tube, 2.8 g of the polymer (B2) synthesized in Referential Example 2, 2.7 g of N,N-diethyl imidazolium bromide, and 100 ml of chloroform were placed and stirred to be completely dissolved therein. The solution as kept bubbled with a nitrogen gas was left reacting at room temperature (20° C.) for 3 hours.

After the reaction was completed, the reaction solution was distilled in an evaporator to expel chloroform. The residue was thoroughly dried in a vacuum drier (60° C., 1 mmHg) over a period of 40 hours, to obtain 4.3 g of a polymer (4). When the resultant polymer (4) was thermally analyzed with a differential scanning calorimeter, it was found to have a glass transition point of −50.8° C.

EXAMPLE 5

Synthesis of polymer (5)

In a three-neck flask having an inner volume of 200 ml and provided with a reflux tube, 3 g of the polymer (B3)

synthesized in Referential Example 3, 3.93 g of N,N-dibutyl imidazoliumbromide, and 100 ml of tetrahydrofuran were placed and stirred to be completely dissolved therein The solution as kept bubbled with an argon gas was left reacting at room temperature (20° C.) for 24 hours.

After the reaction was completed, the reaction solution was distilled in an evaporator to expel tetrahydrofuran. The residue was thoroughly dried in a vacuum drier (100° C., 1 mmHg) over a period of 15 hours, to obtain 6.4 g of a polymer (5). When the resultant polymer (5) was thermally analyzed with a differential scanning calorimeter, it was found to have a glass transition point of −57.6° C.

EXAMPLE 6

Synthesis of polymer (6)

In a three-neck flask having an inner volume of 200 ml and provided with a reflux tube, 5 g of the polymer (B4) synthesized in Referential Example 4, 13.1 g of N,N-dibutyl imidazoliumbromide, and 100 ml of tetrahydrofuran were placed and stirred to be completely dissolved therein. The solution as kept bubbled with an argon gas was left reacting at room temperature (20° C.) for 24 hours.

After the reaction was completed, the reaction solution was distilled in an evaporator to expel tetrahydrofuran. The residue was thoroughly dried in a vacuum drier (100° C., 1 mmHg) over a period of 15 hours, to obtain 17.2 g of a polymer (6). When the resultant polymer (6) was thermally analyzed with a differential scanning calorimeter, it was found to have a glass transition point of −52.3° C.

EXAMPLE 7

Synthesis of polymer (7)

In a three-neck flask having an inner volume of 200 ml and provided with a reflux tube, 4 g of the polymer (A1) synthesized in Referential Example 5, 7.23 g of N,N-dibutyl imidazoliumbromide, and 100 ml of tetrahydrofuran were placed and stirred to be completely dissolved therein. The solution as kept bubbled with an argon gas was left reacting at room temperature (20° C.) for 24 hours.

After the reaction was completed, the reaction solution was distilled in an evaporator to expel tetrahydrofuran. The residue was thoroughly dried in a vacuum drier (100° C., 1 mmHg) over a period of 15 hours, to obtain 9.3 g of a polymer (7). When the resultant polymer (7) was thermally analyzed with a differential scanning calorimeter, it was found to have a glass transition point of −45.5° C.

EXAMPLE 8

Synthesis of polymer (8)

In a three-neck flask having an inner volume of 200 ml and provided with a reflux tube, 4 g of the polymer (B5) synthesized in Referential Example 6, 5.08 g of N,N-dibutyl imidazoliumbromide, and 100 ml of tetrahydrofuran were placed and stirred to be completely dissolved therein. The solution as kept bubbled with an argon gas was left reacting at room temperature (20° C.) for 24 hours.

After the reaction was completed, the reaction solution was distilled in an evaporator to expel tetrahydrofuran. The residue was thoroughly dried in a vacuum drier (100° C., 1 mmHg) over a period of 15 hours, to obtain 7.4 g of a polymer (8). When the resultant polymer (8) was thermally analyzed with a differential scanning calorimeter, it was found to have a glass transition point of −52.6° C.

EXAMPLE 9

Synthesis of polymer (9)

In a three-neck flask having an inner volume of 200 ml and provided with a reflux tube, 4 g of the polymer (B5) synthesized in Referential Example 6, 6.91 g of N-ethyl-N-n-propyl imidazolium bis(trifluoromethanesulfonyl) imide, and 100 ml of tetrahydrofuran were placed and stirred to be completely dissolved therein. The solution as kept bubbled with an argon gas was left reacting at room temperature (20° C.) for 24 hours.

After the reaction was completed, the reaction solution was distilled in an evaporator to expel tetrahydrofuran. The residue was thoroughly dried in a vacuum drier (100° C., 1 mmHg) over a period of 15 hours, to obtain 9.1 g of a polymer (9). When the resultant polymer (9) was thermally analyzed with a differential scanning calorimeter, it was found to have a glass transition point of −51.4° C.

EXAMPLE 10

Synthesis of macromolecular solid electrolyte (1)

In an egg plant type flask having an inner volume of 50 ml, 0.5 g of the polymer (1) obtained in Example 1, 0.36 g of $(CF_3SO_2)_2NLi$, and 10 ml of dehydrated acetone were placed to be completely dissolved therein. The resultant solution was stirred at room temperature for 30 minutes and vaporized in an evaporator to expel acetone. The residue was thoroughly dried in a vacuum drier (80° C., 1 mmHg) over a period of 12 hours, to obtain a macromolecular solid electrolyte (1). The resultant macromolecular solid electrolyte (1) was tested for the ion conductivity by a complex impedance method. It was consequently found to show such high ion conductivity as $8.4 \times 10^{-4}$ S/cm at 30° C. and $3.6 \times 10^{-4}$ S/cm at 10° C.

EXAMPLE 11

Synthesis of macromolecular solid electrolyte (2)

In an egg plant type flask having an inner volume of 50 ml, 0.5 g of the polymer (2) obtained in Example 2, 0.4 g of $(CF_3SO_2)_2NLi$, and 10 ml of dehydrated acetone were placed to be completely dissolved therein. The resultant solution was stirred at room temperature for 30 minutes and vaporized in an evaporator to expel acetone. The residue was thoroughly dried in a vacuum drier (80° C., 1 mmHg) over a period of 12 hours, to obtain a macromolecular solid electrolyte (2). The resultant macromolecular solid electrolyte (2) was tested for the ion conductivity by a complex impedance method. It was consequently found to show such high ion conductivity as $6.7 \times 10^{-4}$ S/cm at 30° C. and $2.9 \times 10^{-4}$ S/cm at 10° C.

EXAMPLE 12

Synthesis of macromolecular solid electrolyte (3)

In an egg plant type flask having an inner volume of 50 ml, 0.5 g of the polymer (5) obtained in Example 5, 0.36 g of $(CF_3SO_2)_2NLi$, and 10 ml of dehydrated tetrahydrofuran were placed to be completely dissolved therein. The resultant solution was stirred at room temperature for 30 minutes and vaporized in an evaporator to expel tetrahydrofuran. The residue was thoroughly dried in a vacuum drier (80° C., 1 mmHg) over a period of 12 hours, to obtain a macromolecular solid electrolyte (3). The resultant macromolecular solid electrolyte (3) was tested for the ion conductivity by a complex impedance method. It was consequently found to show such high ion conductivity as $7.7 \times 10^{-4}$ S/cm at 30° C. and $2.6 \times 10^{-4}$ S/cm at 10° C.

EXAMPLE 13

Synthesis of macromolecular solid electrolyte (4)

In an egg plant type flask having an inner volume of 50 ml, 0.5 g of the polymer (6) obtained in Example 6, 0.72 g of (CF$_3$SO$_2$)$_2$NLi, and 10 ml of dehydrated tetrahydrofuran were placed to be completely dissolved therein. The resultant solution was stirred at room temperature for 30 minutes and vaporized in an evaporator to expel tetrahydrofuran. The residue was thoroughly dried in a vacuum drier (80° C., 1 mmHg) over a period of 12 hours, to obtain a macromolecular solid electrolyte (4). The resultant macromolecular solid electrolyte (4) was tested for the ion conductivity by a complex impedance method. It was consequently found to show such high ion conductivity as 8.1×10$^{-4}$ S/cm at 30° C. and 3.6×10$^{-4}$ S/cm at 10° C.

EXAMPLE 14
Synthesis of macromolecular solid electrolyte (5)

In an egg plant type flask having an inner volume of 50 ml, 0.5 g of the polymer (7) obtained in Example 7, 0.61 g of (CF$_3$SO$_2$)$_2$NLi, and 10 ml of dehydrated tetrahydrofuran were placed to be completely dissolved therein. The resultant solution was stirred at room temperature for 30 minutes and vaporized in an evaporator to expel tetrahydrofuran. The residue was thoroughly dried in a vacuum drier (100° C., 1 mmHg) over a period of 15 hours, to obtain a macromolecular solid electrolyte (5). The resultant macromolecular solid electrolyte (5) was tested for the ion conductivity by a complex impedance method. It was consequently found to show such high ion conductivity as 7.66×10$^{-4}$ S/cm at 30° C. and 2.8×10$^{-4}$ S/cm at 10° C.

EXAMPLE 15
Synthesis of macromolecular solid electrolyte (6)

In an egg plant type flask having an inner volume of 50 ml, 0.5 g of the polymer (8) obtained in Example 8, 0.46 g of (CF$_3$SO$_2$)$_2$NLi, and 10 ml of dehydrated acetone were placed to be completely dissolved therein. The resultant solution was stirred at room temperature for 30 minutes and vaporized in an evaporator to expel acetone. The residue was thoroughly dried in a vacuum drier (80° C., 1 mmHg) over a period of 12 hours, to obtain a macromolecular solid electrolyte (6). The resultant macromolecular solid electrolyte (6) was tested for the ion conductivity by a complex impedance method. It was consequently found to show such high ion conductivity as 6.7×10$^{-4}$ S/cm at 30° C. and 2.9×10$^{-4}$ S/cm at 10° C.

EXAMPLE 16
Synthesis of macromolecular solid electrolyte (7)

In an egg plant type flask having an inner volume of 50 ml, 0.5 g of the polymer (9) obtained in Example 9, 0.22 g of (CF$_3$SO$_2$)$_2$NLi, and 10 ml of dehydrated acetone were placed to be completely dissolved therein. The resultant solution was stirred at room temperature for 30 minutes and vaporized in an evaporator to expel acetone. The residue was thoroughly dried in a vacuum drier (80° C., 1 mmHg) over a period of 12 hours, to obtain a macromolecular solid electrolyte (7). The resultant macromolecular solid electrolyte (7) was tested for the ion conductivity by a complex impedance method. It was consequently found to show such high ion conductivity as 8.1×10$^{-4}$ S/cm at 30° C. and 4.2×10$^{-4}$ S/cm at 10° C.

The entire disclosure of Japanese Patent Application Nos., 11-374,637, 2000-318,116, and 2000-349,822 filed on Dec. 28, 1999, Oct. 18, 2000, and Nov. 16, 2000 including specification, claims, drawings and summary are incorporated herein by reference in its entirety.

What is claimed is:

1. A macromolecular solid electrolyte composition which comprises a polymer formed of structural units represented by the following formula (1):

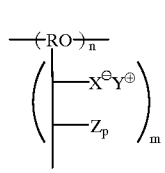

wherein R represents a linear or branched alkylene residue of 1 to 4 carbon atoms; X$^-$ represents a deprotonated residue of an acid; Y$^+$ represents a cation of a nitrogen-containing compound; Z represents a residue of a monoethylenically unsaturated compound; m represents an average number of moles of a branched chain bound to the structural unit, —(RO)—, forming a main chain, and is in the range of 2 to 20; n is in the range of 3 to 500; and p is in the range of 0 to 2, and a lithium salt.

2. A composition according to claim 1, wherein said polymer is represented by the following formula:

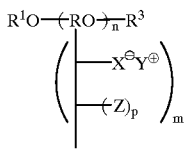

wherein R$^1$ and R$^3$ independently represent a hydrogen atom, a group having a carboxylic acid group or a sulfonic acid group, a linear or branched alkyl group of 1 to 4 carbon atoms, or an aryl group of 6 to 10 carbon atoms; R represents a linear or branched alkylene residue of 1 to 4 carbon atoms; X$^-$ represents a deprotonated residue of an acid; Y$^+$ represents a cation of a nitrogen-containing compound; Z represents a residue of a monoethylenically unsaturated compound; m represents an average number of moles of a branched chain bound to the structural unit, —(RO)—, forming a main chain and is in the range of 2 to 20; n is in the range of 3 to 500; and p is in the range of 0 to 2.

3. A composition according to claim 1, wherein R in the formula (1) represents an ethylene residue.

4. A composition according to claim 1, wherein X$^-$ in the formula (1) represents a residue having —COO$^-$.

5. A composition according to claim 1, wherein Y$^+$ in the formula (1) represents a quaternary ammonium ion.

6. A composition according to claim 5, wherein said quaternary ammonium ion is selected from the group consisting of:

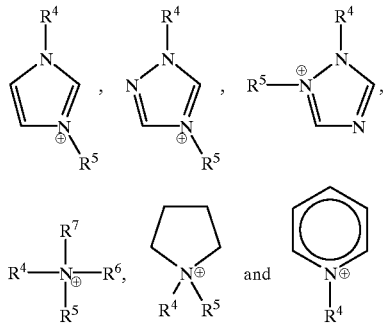

wherein R$^4$, R$^5$, R$^6$, and R$^7$ independently represent a linear or branched alkyl group of 1 to 4 carbon atoms.

7. A composition according to claim 1, wherein Z in the formula (1) represents a residue of maleic acid, fumaric acid, or maleic anhydride.

8. A composition according to claim 1, wherein said polymer has a glass transition point of not more than −30° C.

9. A composition which is obtained by polymerizing a monomer having an acid group to a compound represented by the following formula (2):

wherein $R^1$ and $R^3$ independently represent a hydrogen atom, a group having a carboxylic acid group or a sulfonic acid group, a linear or branched alkyl group of 1 to 4 carbon atoms, or an aryl group of 6 to 10 carbon atoms; $R^2$ represents a linear or branched alkylene of 1 to 4 carbon atoms; and n is in the range of 3 to 500, to obtain a polymer (A), and causing said polymer (A) to react with a cationic nitrogen-containing compound, and combining said polymer with a lithium salt.

10. A composition which is obtained by polymerizing a monomer having an acid group to a compound represented by the above-mentioned formula (2):

wherein $R^1$ and $R^3$ independently represent a hydrogen atom, a group having a carboxylic acid group or a sulfonic acid group, a linear or branched alkyl group of 1 to 4 carbon atoms, or an aryl group of 6 to 10 carbon atoms; $R^2$ represents a linear or branched alkylene of 1 to 4 carbon atoms; and n is in the range of 3 to 500, in the presence of a monoethylenic monomer, to obtain a polymer (B), and causing said polymer (B) to react with a cationic nitrogen-containing compound, and combining said polymer with a lithium salt.

11. A composition according to claim 9, wherein said cationic nitrogen-containing compound is obtained by the reaction of an alkyl halide with a tertiary amine.

12. A composition according to claim 11, wherein said tertiary amine has a pKa in an aqueous solution at 25° C. in the range of 5 to 12.

13. A composition according to claim 10, wherein said cationic nitrogen-containing compound is obtained by the reaction of an alkyl halide with a tertiary amine.

14. A composition according to claim 13, wherein said tertiary amine has a pKa in an aqueous solution at 25° C. in the range of 5 to 12.

15. A composition according to claim 1, wherein the amount of said lithium salt is in the range of 5 to 70 wt. % based on the weight of said polymer.

16. A composition according to claim 15, wherein said lithium salt is $(CF_3SO_2)_2NLi$ or $(C_2F_5SO_2)_2NLi$.

* * * * *